United States Patent
Laumen et al.

(10) Patent No.: US 7,333,822 B2
(45) Date of Patent: Feb. 19, 2008

(54) METHOD FOR TRANSMITTING MESSAGES IN A TELECOMMUNICATION NETWORK

(75) Inventors: Josef Laumen, Hildesheim (DE); Joerg Reinecke, Sickte (DE); Frank Schange, Hildesheim (DE); Gunnar Schmidt, Wolfenbuettel (DE)

(73) Assignee: IPCOM GmbH & Co., KG, Pullach (DE)

( * ) Notice: Subject to any disclaimer, the term of this patent is extended or adjusted under 35 U.S.C. 154(b) by 253 days.

(21) Appl. No.: 10/182,687

(22) PCT Filed: Jan. 25, 2001

(86) PCT No.: PCT/DE01/00285

§ 371 (c)(1),
(2), (4) Date: Oct. 29, 2002

(87) PCT Pub. No.: WO01/58183

PCT Pub. Date: Aug. 9, 2001

(65) Prior Publication Data

US 2003/0109269 A1 Jun. 12, 2003

(30) Foreign Application Priority Data

Feb. 2, 2000 (DE) .................... 100 04 260

(51) Int. Cl.
*H04Q 7/20* (2006.01)

(52) U.S. Cl. ............... 455/466; 455/426.1; 455/412.1; 455/415; 455/552.1; 370/352; 370/469; 710/117

(58) Field of Classification Search ............ 455/426.1, 455/412.1, 415, 466, 552.1; 370/352, 469; 710/117

See application file for complete search history.

(56) References Cited

U.S. PATENT DOCUMENTS

| | | | |
|---|---|---|---|
| 5,625,670 A * | 4/1997 | Campana et al. ......... | 455/412.1 |
| 5,742,668 A * | 4/1998 | Pepe et al. ................. | 455/415 |
| 5,905,879 A * | 5/1999 | Lambrecht .................. | 710/117 |
| 6,038,296 A * | 3/2000 | Brunson et al. ........ | 379/100.11 |
| 6,195,345 B1 * | 2/2001 | Kramer ...................... | 370/352 |
| 6,205,330 B1 * | 3/2001 | Winbladh ................ | 455/426.1 |
| 6,556,586 B1 * | 4/2003 | Sipila ......................... | 370/469 |

FOREIGN PATENT DOCUMENTS

| | | |
|---|---|---|
| EP | 1 091 601 | 4/2001 |
| JP | 11187155 | 7/1999 |
| JP | 11511608 T | 10/1999 |
| JP | 1111511608 T | * 10/1999 |
| WO | WO 97 08906 | 3/1997 |
| WO | WO 99/52247 | 10/1999 |
| WO | WO 01 13656 | 2/2001 |

* cited by examiner

*Primary Examiner*—Steve M. D'Agosta
(74) *Attorney, Agent, or Firm*—Kenyon & Kenyon LLP

(57) ABSTRACT

A method is provided for transmitting messages, for example, in a telecommunications network, in which a first message service and a second message service are available. Dedicated messages of the first message service are sent using messages of the second message service. An exemplary method may permit an optimized transmission scheme to be maintained for the dedicated messages of the first message service.

26 Claims, 4 Drawing Sheets

METHOD FOR TRANSMITTING MESSAGES IN A TELECOMMUNICATION NETWORK

FIELD OF THE INVENTION

The present invention relates to a method for transmitting messages in a telecommunications network, in which a first message service and a second message service are available.

BACKGROUND INFORMATION

Although it may be used in principle for any multimedia message service and telecommunications network, an exemplary embodiment according to the present invention and the problem on which it is based are explained with regard to the MMS service (MMS=Multimedia Messaging Service), which is specified within the framework of the standardization of 3GPP (3rd Generation Project Program) and may be used, for example, in the GSM system (GSM=Global System for Mobile Communications) and the UMTS system (UMTS=Universal Mobile Telecommunication System).

There exists short message services, which may be used to send a short message to a subscriber of the telecommunications network without first having to establish a telecommunications connection to the subscriber.

This may be important in mobile radio communication systems such as GSM, since their subscribers may not be reached. In this context, incoming short messages for the subscriber may be stored by a telecommunications carrier of the telecommunications network, when the subscriber cannot be reached. At a later time, when the subscriber may be reached again, the short message is then automatically transmitted to the subscriber.

The SMS service (SMS=Short Message Service) is a short message service following the GSM standard. In this context, up to 160 7-bit ASCII message characters (ASCII=American Standard Code for Information Interchange) may be transmitted in a short message. Concatenated short messages permit the transmission of longer texts. Since only text transmission according to the GSM standard is provided, binary data, such as audio data, image data, etc., should be converted to text format when transmitted, and reconverted to binary format after being received.

In this process, it may only be possible to access the entire content of a short message. In this manner, data of the short message, which the addressed subscriber may not desire, may be transmitted to the subscriber, who only receives an overview of the content of the short message after having received the complete short message from the telecommunications carrier.

FIG. 4 shows the principal structure of a first type A of an SMS short message in GSM.

In general, an SMS short message SM of the first type A includes a header SM-H and a data portion SM-D. Header SM-H includes signaling inputs and the receiver address of a message to be sent, and the sender address of a message to be received. Data portion SM-D includes the actual message to be transmitted.

Transmitters and receivers are identified by the MSISDN (Mobile Subscriber Integrated Services Digital Network) number in accordance with GSM 03.40 V7.1.0 (11/1998) Technical Realization of the Short Message Service (SMS); Point-to-Point (PP) and 3G 23.040 V3.2.0 (10/1999) Technical Realization of the Short Message Service (SMS); and Point-to-Point (PP).

A second header (user data header SM-DH) may optionally be present in data portion SM-D. If so, then the presence of the second header is indicated by a corresponding signaling input in header SM-H. Various types of SMS user data headers are already specified in GSM 03.40/3G 23.040. Different types of user data headers SM-DH are distinguished by an identification element in user data header SM-DH.

The concatenation of short messages SM may be controlled, for example, by a user data header SM-DH (identifier: "08" hexadecimal). A further example of a user data header SM-DH is the "Wireless Control Message Protocol", which is indicated by the identifier "09" in hexadecimal notation. This may be required for the Wireless Application Protocol (WAP).

FIG. 5 shows the principal structure of a second type B of an SMS short message in GSM.

In this case, an SMS short message SM' may include a header SM-H' and a data portion SM-D'. Header SM-H' includes signaling inputs and the receiver address of a message to be sent, and the sender address of a message to be received. Data portion SM-D' includes the actual message to be transmitted.

Header SM-H' includes a field, which is 8 bits wide and referred to as the TP-PID (Transfer Protocol—Protocol Identifier). Parameter TP-PID may be used to establish the applied protocol. For example, it may be used to realize telematic interworking or to determine how messages are handled in the cellular phone or SMSC (short message service center).

In telematic interworking, the TP-PID is a bit pattern of the form <00xxxxx>, that is, bit 7=0, bit 6=0, and bit 5=1.

If this bit pattern appears in the TP-PID of header SM-H' of an SMS short message SM' sent by a cellular phone, then the SMSC (Short Message Service Center) is induced to convert the present SMS to a different data format and/or to execute a certain communications protocol. In this manner, e.g., a fax of the group 3 may be sent by a cellular phone to a fax machine in the fixed network. In this case, the value of the entire TP-PID octet is <00100010>.

If this bit pattern appears in the TP-PID of header SM-H' of an SMS short message SM' received by a cellular phone, then the SMSC has received a message from a non-SMS telematic service and converted it to an SMS. In this manner, e.g., an Internet e-mail may be sent from any e-mail account in the fixed network, via the service center, to a cellular phone. In this case, the value of the received TP-PID octet is <00110010>.

In the case of handling messages, the TP-PID is a bit pattern of the form <01xxxxxx>, that is, bit 7=0, and bit 6=1.

If this bit pattern appears in the TP-PID of the header SM-H' of an SMS short message SM' received by a cellular phone, then the SMSC causes the cellular phone to handle the message in a certain manner. In this manner, e.g., a cellular phone may be induced by the SMSC to relay the received message to the SIM (subscriber identity module), where it is then processed further in accordance with SIM application toolkits. In this case, the value of the received TP-PID octet is <01111111>.

If this bit pattern appears in the TP-PID of the header SM-H' of an SMS short message SM' sent by a cellular phone, then, e.g., in the case of the bit pattern <01000001>, the SMSC is caused to overwrite an already present short message of the same cellular phone with the received short message.

The MMS service is intended to permit the transmission and reception of multimedia messages, using a cellular phone. The current (temporary) state of standardization of MMS is found in 3G TS 23.140, MMS Stage 2, v.1.0.0. In contrast to an SMS short message, a multimedia message (MM) should not be limited to a certain length or to the display of only text. An MM should instead support various types of media.

The MMS relay has a central function in the MMS service. As shown in 3G TS 23.140, MMS Stage 2, v.1.0.0, this element may be connected to various servers (e.g. an email server, fax server, voice mailbox, and MMS server), using a large variety of media. Its purpose is to grant the mobile user access to all of the information/messages on the above-mentioned servers.

Thus, the MMS relay allows the mobile user access to e-mails on the e-mail server, or to faxes stored on a fax server, or to voice messages recorded in a voice mailbox, etc. Aside from the receipt of messages, the mobile user may write messages and send them to the desired recipient via the MMS relay.

3G TS 23.140, MMS Stage 2, v.1.0.0, provides for, inter alia, the user of the MMS service logging on to his MMS service provider (session establishment). The user may then obtain a receipt for the log-on (receipt), depending on a service profile. If the MMS server contains unread messages for the user, then the user may receive a message (notification) in accordance with his/her service profile.

In this regard, an MMS server may stand for one or more arbitrary servers, e.g., one or more e-mail servers, fax servers, special MMS servers (if an independent MM format is standardized), or an arbitrary combinations of these servers.

In the same way, the user may receive a message in accordance with his/her service profile, when a new message arrives at the MMS server during an MMS session.

If his/her profile is set up so that the user does not automatically receive notification of unread and/or new MM messages, then, according to the specification, the MMS service should allow the user to explicitly request such a notification from the MMS relay (explicit notification query).

In the service profile, the user may also specify whether he/she would like to receive a confirmation of the success of transmitting the MM's to other users from the service provider. In this connection, one may distinguish between two types.

The user may receive a reply from the MMS relay indicating that his/her sent message was successfully sent to the relay via the air interface:

(ACK/NACK submission 1: positive/negative acknowledgment of submission to relay).

In addition, the user may receive a reply from the receiver and/or from the MMS relay indicating that the receiver successfully received the message:

ACK/NACK submission 2=positive/negative end-to-end acknowledgment of submission to receiver.

The MMS service should also optionally permit the service provider (the MMS relay) to receive a reply regarding the success/failure of the delivery of an MM to a subscriber:

ACK/NACK delivery.

3G TS 23.140, MMS Stage 2, v.1.0.0, 3GPP TSG T WG 2, November 1999, also provides for the triggering of automatic downloading of messages by an SMS (pull-push).

The above-described functionality and messages regarding the MM are written in the applications level, but their implementation is open. This functionality and the messages, as well as similar functionality and messages, may be implemented in many different forms.

It is believed that a general problem is that, in the MMS message service, different types of messages are sent, such as the above-mentioned notifications from the system and actual user messages, whereby the latter may be varied in content, for example, short text messages or long video, audio, or other messages. As a result, it is believed that there is no transmission scheme that is equally optimized for all messages.

SUMMARY OF THE INVENTION

An object of an exemplary embodiment according to the present invention is that predetermined messages of the first message service are sent using messages of the second message service.

It is believed that an exemplary method according to the present invention has an advantage in that an optimized transmission scheme may be maintained for the dedicated messages of the first message service.

With respect to an exemplary method according to the present invention, the SMS message service selects a transmission scheme that provides for simple sending for the dedicated messages in the MMS. Therefore, line-oriented transmission, e.g., using GSM circuit switched data or GPRS general packet radio service or UMTS circuit or packet switched data that are associated with much overhead for setting up a connection/session, may be dispensed with.

An exemplary method according to the present invention provides for messages of the second message service to be sent between the transmitter and the receiver without line-oriented transmission.

According to another exemplary method of the present invention, a dedicated, second group of messages of the first message service is sent between the transmitter and the receiver, using line-oriented transmission.

Yet another exemplary method according to the present invention provides for the first message service to include a multimedia message service, for example, the MMS message service, and/or provides for the second message service to include a short message service, for example, the SMS message service.

Still another exemplary method according to the present invention provides for the first message service to include the MMS message service and the second message service to include the SMS message service. In this context, the dedicated, first group of messages of the first message service includes at least one of the following messages:

dedicated MMS user messages (e.g. short text messages).
notification of the presence of a message on the MMS server (notification).
logging on to an MMS session (session establishment).
receipt for this log-on (receipt).
explicit request for a notification from the MMS relay (explicit notification query).
confirmation of the reception of sent MM's in the relay (ACK/NACK_submission_1).
confirmation of the success in sending an MM's to other users (ACK/NACK_submission_2).
acknowledgment of the success/failure in delivering an MM (ACK/NACK_delivery).
triggering the automatic MM-download (pull-push).

It is believed that an advantage of an exemplary method according to the present invention is that SMS already exists, and the use of this service therefore facilitates the market introduction and acceptance of MMS. SMS permits a reliable service for the above-mentioned notifications. When SMS is used, additional signaling for transmitting notifications is not required. SMS offers a bandwidth-friendly service for such simple notifications, this service also being simultaneously usable for ongoing connections or sessions in the GSM, GPRS, and UMTS systems. SMS is also available in second generation cellular phones (e.g. GSM). Therefore, a user may use essential features of the MMS service without requiring a third generation cellular phone (e.g. UMTS), which may be expensive.

According to another exemplary method of the present invention, the SMS short message is provided with a data portion, which has at least one of the following elements for establishing the message of the first message service: identification of the type of message of the first message service and/or content of the message of the first message service.

According to yet another exemplary method of the present invention, the length of the message of the first message service is specified as a further element for establishing the message of the first message service.

Still another exemplary method according to the present invention provides for at least a portion of the elements being accommodated in a user-data header of the SMS short message.

Yet another exemplary method according to the present invention provides for the user-data header being constructed in WCMP format, in which the message of the first message service is embedded.

According to still another exemplary method of the present invention, the SMS short message is provided with a header, which has an identifier for indicating the presence of a message of the first message service in the data portion.

DETAILED DESCRIPTION

In FIGS. 1 through 5, identical reference symbols denote identical or functionally equivalent elements.

Figure 1:
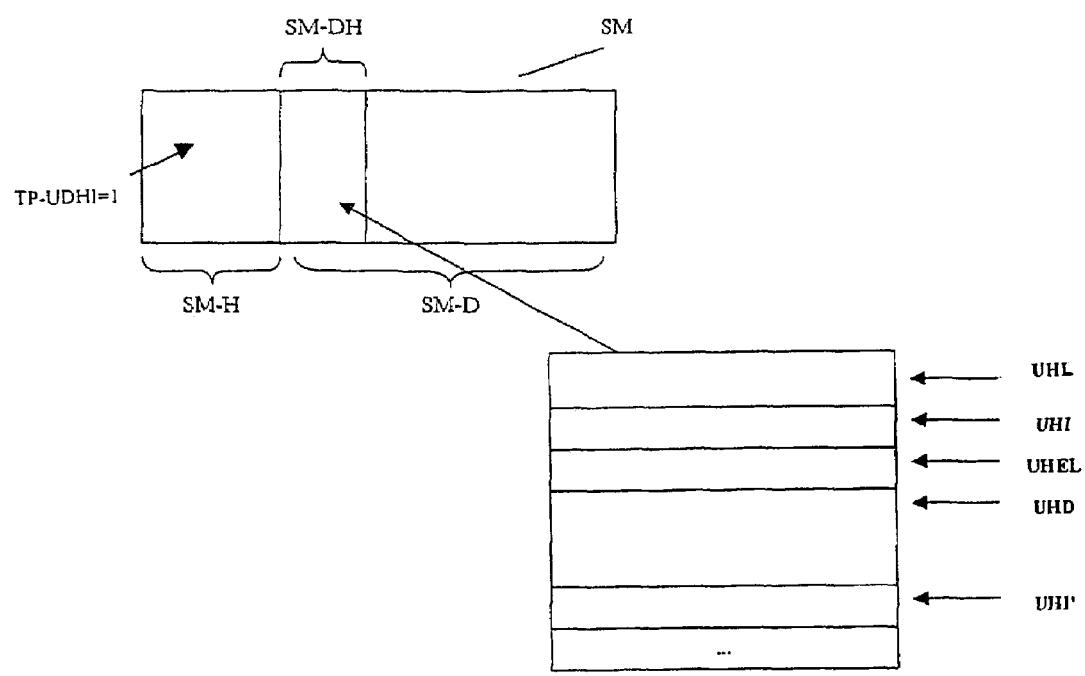
FIG. 1 shows the structure of an SMS short message of the first type A in GSM in accordance with a first exemplary method of the present invention.

FIG. 1 shows the structure of an SMS short message of the first type A in GSM in accordance with a first exemplary method of the present invention.

In the first exemplary embodiment, the first message service is the MMS message service, the second message service is the SMS message service, and the dedicated, first group of messages of the MMS message service includes:

dedicated MMS user messages (e.g. short text messages).

notification of the presence of a message on the MMS server (notification).

logging on to an MMS session (session establishment).

receipt for this log-on (receipt).

explicit request for a notification from the MMS relay (explicit notification query).

confirmation of the reception of sent MM's in the relay (ACK/NACK_submission_1).

confirmation of the success in sending MM's to other users (ACK/NACK_submission_2).

acknowledgment of the success/failure in delivering an MM (ACK/NACK_delivery).

triggering the automatic MM-download (pull-push).

FIG. 1 shows user-data header SM-DH of a type-A SMS short message for establishing a session with the MMS service.

In header SM-H, the presence of a user-data header SM-DH is indicated by flag TP-UDHI=1 in accordance with the standards GSM 03.40 V7.1.0 (11/1998) Technical Realization of the Short Message Service (SMS); Point-to-Point (PP) und 3G 23.040 V3.2.0 (10/1999) Technical Realization of the Short Message Service (SMS); and Point-to-Point (PP).

The formatting of user-data header SM-DH also conforms to the standards. User-data header SM-DH begins with user-data header length UHL followed by identification UHI of the first header element which, for example, may include the MMS session establishment header (hex. 22). This is then followed by length UHEL of the first header element which, for example, may include the necessary length for the MMS session establishment header information. Finally, the MMS session establishment header data fields UHD are provided, which may include, for example, the user ID and the user profile ID. Using the user ID, the user authenticates himself to his/her service provider, and using the profile ID, the user selects the service/user profile desired for this MMS session.

This information in the user-data header SM-DH may be succeeded by further user data header elements, e.g., for SMS concatenation, and, for example, beginning with identification UHI' of the second header element, the further user data header elements being constructed in a manner analogous to the first header element.

If only the MMS session establishment header (hex. 22 in the example) is present, the above-mentioned standard stipulates that the necessary SMS header/SMS user data header fields be encoded as follows:

SMS header: TP-UDHI=1 (user data header is present),

SMS user data header:
 UDHL=user data header length UHL.
 IEI=UHI=22 (user data header identification=hex. 22 for MMS session establishment).
 IEIDL=length of this user data header element UHEL.
 further information: user ID, profile ID.
 SMS data: empty, or additional SMS user data header or text message.

A unique user data header indicator UHI should be defined for each type of dedicated MMS message.

A mapping table may appear as follows:

TABLE 1

Exemplary Assignment of Information Element Identifiers (IEI)

| Type of Dedicated MMS Message | IEI-Code |
|---|---|
| MMS user message | 20 |
| MMS notification | 21 |
| MMS session establishment | 22 |
| MMS receipt (of establishment) | 23 |
| MMS explicit notification-query | 24 |
| MMS ACK/NACK of submission (1) | 25 |
| MMS ACK/NACK of submission (2) | 26 |

TABLE 1-continued

Exemplary Assignment of Information Element Identifiers (IEI)

| Type of Dedicated MMS Message | IEI-Code |
|---|---|
| MMS ACK/NACK of delivery | 27 |
| MMS pull-push | 28 |

Figure 2:
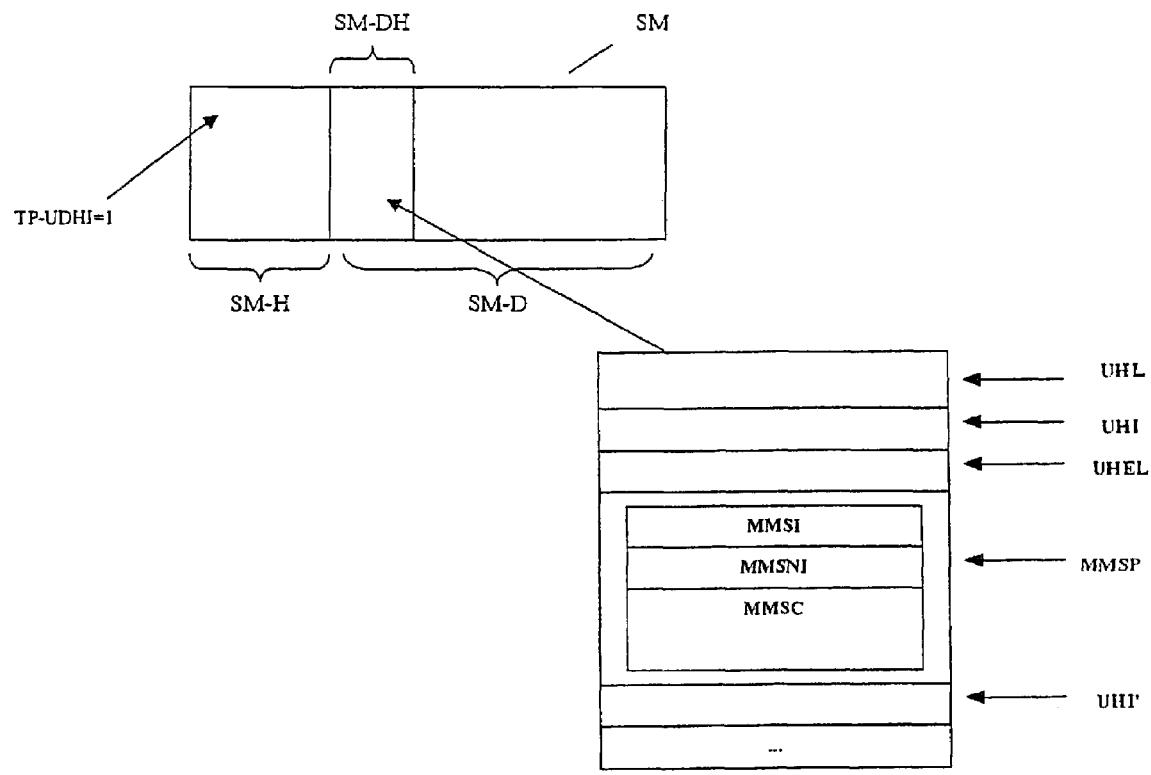
FIG. 2 shows the structure of an SMS short message of the first type A in GSM, in accordance with a second exemplary method of the present invention.

FIG. 2 shows the structure of an SMS short message of the first type A in GSM, in accordance with a second exemplary method of the present invention.

The exemplary embodiment shown in FIG. 2 is similar to the first exemplary embodiment described above, except that, in the example for the MMS session establishment, it includes a WCMP (wireless control message protocol) user data header having an embedded MMS protocol.

Identification UHI of this user data header is executed in the form of hexadecimal 09, in accordance with the standards GSM 03.40 V7.1.0 (11/1998) Technical Realization of the Short Message Service (SMS); Point-to-Point (PP) and 3G 23.040 V3.2.0 (10/1999) Technical Realization of the Short Message Service (SMS); and Point-to-Point (PP).

As shown in FIG. 2, user data header SM-DH begins with user data header length UHL, followed by identification UHI of the first header, which may include, for example, hex. 09 for WCMP. This is then followed by the length of the user data header element UHEL, which may include, for example, the necessary length of the WCMP header (including the entire embedded MMS protocol). Finally, the WCMP fields in the MMS protocol are provided, which are referred to as MMSP. These include a designation MMSI (also called an MMS identifier), which indicates that an MMS protocol is implemented using the WCMP field. The subsequent identifier MMSNI indicates the type of MMS protocol. It therefore specifies the type of MMS message, and consequently corresponds to the content of parameter UHI in the first exemplary embodiment. Parameter MMSC indicates the user ID and profile ID in the example of MMS session establishment.

Similarly to the first exemplary embodiment according to the present invention, a unique indicator should be defined for each type of message.

A mapping table may appear as follows:

TABLE 2

Exemplary Assignment of MMSNI Codes

| Type of Dedicated MMS Message | MMSNI-Code |
|---|---|
| MMS user message | 0 |
| MMS notification | 1 |
| MMS session establishment | 2 |
| MMS receipt (of establishment) | 3 |
| MMS explicit notification-query | 4 |
| MMS ACK/NACK of submission (1) | 5 |
| MMS ACK/NACK of submission (2) | 6 |
| MMS ACK/NACK of delivery | 7 |
| MMS pull-push | 8 |

Figure 3:
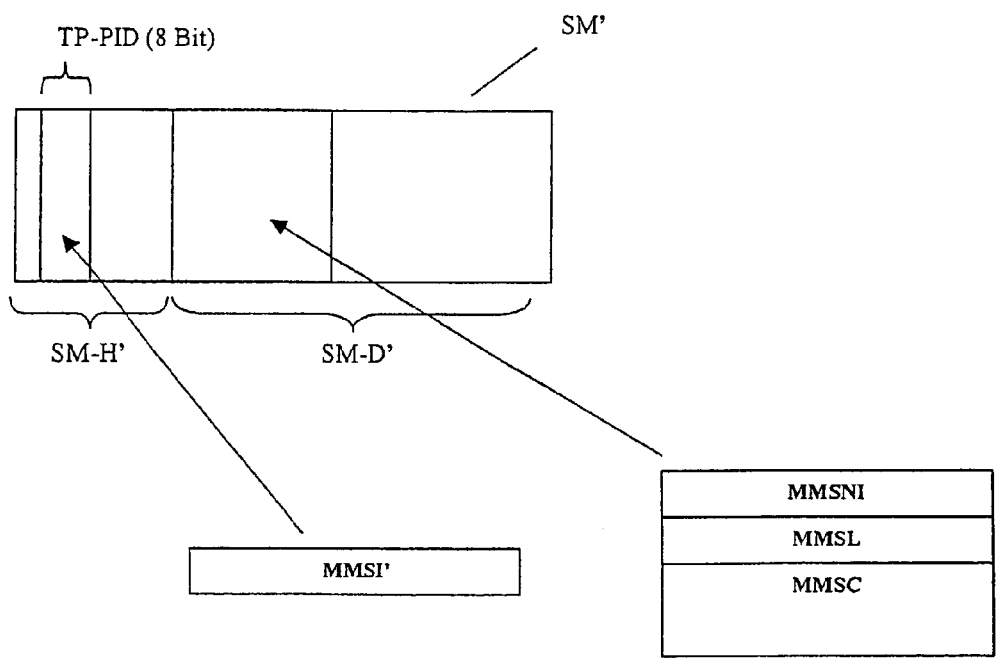
FIG. 3 shows the structure of an SMS short message of the second type B in GSM, in accordance with a third exemplary method of the present invention.
Figure 4:
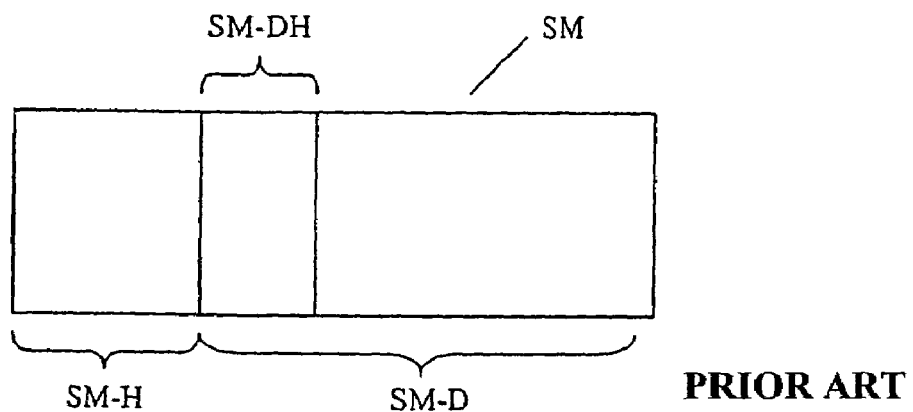
FIG. 4 shows the principal structure of a first type A of SMS in GSM.
Figure 5:
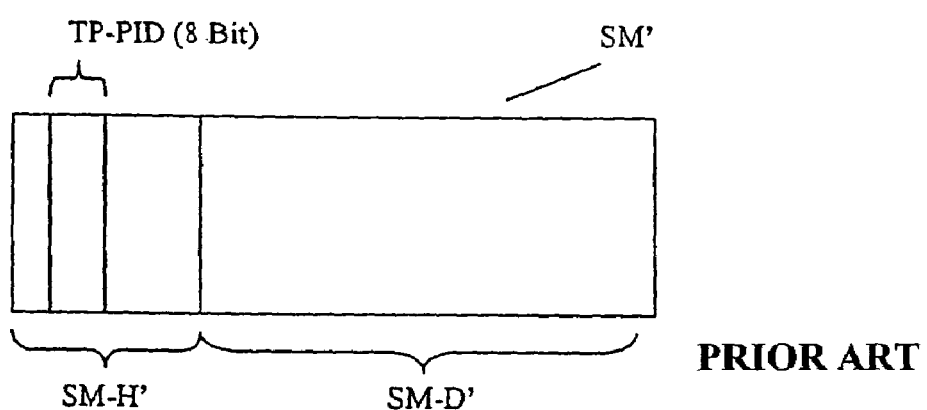
FIG. 5 shows the principal structure of a second type B of SMS short message in GSM.

FIG. 3 shows the structure of an SMS short message of the second type B in GSM, in accordance with a third exemplary method of the present invention.

While the first and second exemplary embodiments described above use the user data header to produce MMS notifications, the TP-PID may be used for identifying such a notification. If so, the service center participates in the protocol whereas, in the first and second exemplary embodiments described above, the service center only forwards the data in a transparent manner.

In the third exemplary method according to the present invention, it is presumed that the MMS relay executes a special MMS protocol with the SMSC, e.g., notifications for the user are transmitted from the MMS relay to the SMSC in a special MMS format, to transmit these messages to the user or transmit notifications from the user to the MMS relay, via the SMSC.

In the SMSC, these notifications are then converted from SMS into the MMS format (and vice versa), in a manner similar to how SMS is converted to fax.

For this purpose, parameter TP-PID in SMS short message SM' is set to a specific value MMSI for the MMS service. This specification establishes, for both the transmitter and receiver, that further information specific to MMS protocol follows in the user data. The appearance of these may be as follows.

An additional MMS message identifier MMNSI' may indicate the type of notification, e.g., an MMS session establishment, which is sent from the user to the MMS relay. For example, these identifiers MMNSI' may again be constructed similar to the parameters MMSNI in Table 2, and may use 8 bits for display. A field MMSL, which may be, e.g., 8 bits wide, defines the length of the following MMS information items, MMSC. These are independent of the type of notification. With respect to the MMS session establishment, the user ID and the ID of the desired profile may be communicated in MMSC, as described above.

Depending on whether telematic interworking or message handling is desired, the TP-PID may be in the form <001xxxxx> (e.g. <00110011>) or <01xxxxxx> (e.g. <01001000>).

Although three exemplary methods according to the present invention are described above, the present invention is not limited to these exemplary embodiments, but rather may be modified in various ways.

For example, the present invention is not limited to telecommunications networks and their services. In addition, the structure of short messages may be varied. Other criteria, such as network utilization, etc., may also be used to determine which messages of the first message service are to be sent by the second message service.

The invention claimed is:

1. A method for transmitting messages in a telecommunications network including a first message service and a second message service, the method comprising:

sending a dedicated, first group of messages of the first message service using messages of the second message service, the second message service being a short message service, a short message being provided with a first data portion including an identification of a type of message of the first message service;

wherein the short message includes an identifier in the first data portion of the short message for indicating a presence of a message of the first message service, and wherein the identifier is distinct from the message of the first message service wherein the first message service includes an MMS message service and the second message service includes an SMS message service, and the dedicated, first group of messages of the first message service includes at least one of the following messages:

dedicated MMS user messages, notification of the presence of a message on the MMS server, logging on to an MMS session,
receipt for the logging on,
explicit request for a notification from the MMS relay,
confirmation of reception of sent MMs in the relay,
confirmation of success in sending MMs to other users,
acknowledgment of success/failure in delivering an MM, and
triggering automatic MM-download.

2. A method for transmitting messages in a telecommunications network including a first message service and a second message service, the method comprising:

sending a dedicated, first group of messages of the first message service using messages of the second message service, the second message service being a short message service, a short message being provided with a first data portion including an identification of a type of message of the first message service;

wherein the short message includes an identifier in the first data portion of the short message for indicating a presence of a message of the first message service in the data portion, wherein the identifier is distinct from the message of the first message service, and wherein the message of the first message service is transmitted in the first data portion, wherein the short message includes a second data portion, the second data portion including at least one of the following elements for defining the message of the first message service:

identification of the type of message of the first message service, and a content of the message of the first message service, and wherein a length of the message of the first message service is specified as an element for defining the message of the first message service.

3. A method for transmitting messages in a telecommunications network including a first message service and a second message service, the method comprising:

sending a dedicated, first group of messages of the first message service by messages of the second message service, the second message service being a short message service, a short message being provided with a first data portion including an identification of a type of message of the first message service;

wherein the short message of said short message service is transmitted in said data portion, wherein the short message includes an identifier for indicating a presence in the first data portion of the short message of the first message service, and wherein the identifier is distinct from the message of the first message service;

wherein the short message includes a second data portion, the second data portion including at least one of the following elements for defining the message of the first message service:

identification of the type of message of the first message service, and a content of the message of the first message service; and wherein a user data header of the short message includes at least a portion of the elements for defining the message of the first message service.

4. A method for transmitting messages in a telecommunications network including a first message service and a second message service, the method comprising:

sending a dedicated, first group of messages of the first message service using messages of the second message service, the second message, service being a short message service, a short message being provided with a first data portion including an identification of a type of message of the first message service;

wherein the short message includes an identifier in the first data portion of the short message for indicating a presence of a message of the first message service in the data portion, wherein the identifier is distinct from the message of the first message service, and wherein the message of the first message service is transmitted in the first data portion wherein the short message includes a second data portion, the second data portion including at least one of the following elements for defining the message of the first message service:

identification of the type of message of the first message service, and a content of the message of the first message service, wherein a user data header of the short message includes at least a portion of the elements for defining the message of the first message service, and wherein the user data header is constructed in WCMP format.

5. A method for transmitting messages in a telecommunications network including a first message service and a second message service, the method comprising:

sending a dedicated, first group of messages of the first message service by messages of the second message service, the second message service being a short message service, a short message being provided with a first data portion including an identification of a type of message of the first message service;

wherein the short message of said short message service is transmitted in said data portion, wherein the short message includes an identifier for indicating a presence in the first data portion of the short message of the first message service, wherein the identifier is distinct from the message of the first message service, wherein the messages of the second message service are sent between a transmitter and a receiver without line-oriented transmission, and wherein the short message includes a second data portion, the second data portion including at least one of the following elements for defining the message of the first message service:

identification of the type of message of the first message service, and a content of the message of the first message service.

6. A method for transmitting messages in a telecommunications network including a first message service and a second message service, the method comprising:

sending a dedicated, first group of messages of the first message service by messages of the second message service, the second message service being a short message service, a short message being provided with a first data portion including an identification of a type of message of the first message service;

wherein the short message of said short message service is transmitted in said data portion, wherein the short message includes an identifier for indicating a presence in the first data portion of the short message of the first message service, and wherein the identifier is distinct from the message of the first message service, wherein a dedicated second group of messages of the first message service is sent between a transmitter and a receiver using line-oriented transmission, and wherein the short message includes a second data portion, the second data portion including at least one of the following elements for defining the message of the first message service:

identification of the type of message of the first message service, and a content of the message of the first message service.

7. A method for transmitting messages in a telecommunications network including a first message service and a second message service, the method comprising:

sending a dedicated, first group of messages of the first message service by messages of the second message service, the second message service being a short message service, a short message being provided with a first data portion including an identification of a type of message of the first message service;

wherein the short message of said short message service is transmitted in said data portion, wherein the short message includes an identifier for indicating a presence in the first data portion of the short message of the first message service, and wherein the identifier is distinct from the message of the first message service;

wherein the messages of the second message service are sent between a transmitter and a receiver without line-oriented transmission; and wherein one of the following is satisfied:
(i) the first message service includes a multimedia message service;
(ii) the short message includes a second data portion, the second data portion including at least one of the following elements for defining the message of the first message service: identification of the type of message of the first message service, and a content of the message of the first message service;
(iii) a user data header of the short message includes at least a portion of the elements for defining the message of the first message service; and
(iv) a header of the short message includes an identifier for indicating a presence of the message of the first message service.

8. The method of claim 7, wherein the first message service includes a multimedia message service.

9. The method of claim 7, wherein the short message includes a second data portion, the second data portion including at least one of the following elements for defining the message of the first message service: identification of the type of message of the first message service, and a content of the message of the first message service.

10. The method of claim 7, wherein a user data header of the short message includes at least a portion of the elements for defining the message of the first message service.

11. The method of claim 7, wherein a header of the short message includes an identifier for indicating a presence of the message of the first message service.

12. A method for transmitting messages in a telecommunications network including a first message service and a second message service, the method comprising:

sending a dedicated, first group of messages of the first message service by messages of the second message service, the second message service being a short message service, a short message being provided with a first data portion including an identification of a type of message of the first message service;

wherein the short message of said short message service is transmitted in said data portion, wherein the short message includes an identifier for indicating a presence in the first data portion of the short message of the first message service, and wherein the identifier is distinct from the message of the first message service;

wherein a dedicated second group of messages of the first message service is sent between a transmitter and a receiver using line-oriented transmission; and wherein one of the following is satisfied:
(i) the first message service includes a multimedia message service;
(ii) the short message includes a second data portion, the second data portion including at least one of the following elements for defining the message of the first message service: identification of the type of message of the first message service, and a content of the message of the first message service;
(iii) a user data header of the short message includes at least a portion of the elements for defining the message of the first message service; and
(iv) a header of the short message includes an identifier for indicating a presence of the message of the first message service.

13. The method of claim 12, wherein the first message service includes a multimedia message service.

14. The method of claim 12, wherein the short message includes a second data portion, the second data portion including at least one of the following elements for defining the message of the first message service: identification of the type of message of the first message service, and a content of the message of the first-message service.

15. The method of claim 12, wherein a user data header of the short message includes at least a portion of the elements for defining the message of the first message service.

16. The method of claim 12, wherein a header of the short message includes an identifier for indicating a presence of the message of the first message service.

17. A method for transmitting messages in a telecommunications network including a first message service and a second message service, the method comprising:

sending a dedicated, first group of messages of the first message service by messages of the second message service;

wherein the first message service includes an MMS message service according to the 3GPP system, and the dedicated, first group of messages of the first message service includes at least one of the following messages: dedicated MMS user messages, confirmation of reception of sent MMs in the relay, confirmation of success in sending MMs to other users, and acknowledgment of success/failure in delivering an MM;

wherein the messages of the second message service are sent between a transmitter and a receiver without line-oriented transmission; and wherein one of the following is satisfied:
(i) the first message service includes a multimedia message service;
(ii) the short message includes a second data portion, the second data portion including at least one of the following elements for defining the message of the first message service: identification of the type of message of the first message service, and a content of the message of the first message service;
(iii) a user data header of the short message includes at least a portion of the elements for defining the message of the first message service; and
(iv) a header of the short message includes an identifier for indicating a presence of the message of the first message service.

18. The method of claim 17, wherein the first message service includes a multimedia message service.

19. The method of claim 17, wherein the short message includes a second data portion, the second data portion including at least one of the following elements for defining the message of the first message service: identification of the type of message of the first message service, and a content of the message of the first message service.

20. The method of claim 17, wherein a user data header of the short message includes at least a portion of the elements for defining the message of the first message service.

21. The method of claim 17, wherein a header of the short message includes an identifier for indicating a presence of the message of the first message service.

22. A method for transmitting messages in a telecommunications network including a first message service and a second message service, the method comprising:

sending a dedicated, first group of messages of the first message service by messages of the second message service;

wherein the first message service includes an MMS message service according to the 3GPP system, and the dedicated, first group of messages of the first message service includes at least one of the following messages: dedicated MMS user messages, confirmation of reception of sent MMs in the relay, confirmation of success in sending MMs to other users, and acknowledgment of success/failure in delivering an MM;

wherein a dedicated second group of messages of the first message service is sent between a transmitter and a receiver using line-oriented transmission; and wherein one of the following is satisfied:
(i) the first message service includes a multimedia message service;
(ii) the short message includes a second data portion, the second data portion including at least one of the following elements for defining the message of the first message service: identification of the type of message of the first message service, and a content of the message of the first message service;
(iii) a user data header of the short message includes at least a portion of the elements for defining the message of the first message service; and
(iv) a header of the short message includes an identifier for indicating a presence of the message of the first message service.

23. The method of claim 22, wherein the first message service includes a multimedia message service.

24. The method of claim 22, wherein the short message includes a second data portion, the second data portion including at least one of the following elements for defining the message of the first message service: identification of the type of message of the first message service, and a content of the message of the first message service.

25. The method of claim 22, wherein a user data header of the short message includes at least a portion of the elements for defining the message of the first message service.

26. The method of claim 22, wherein a header of the short message includes an identifier for indicating a presence of the message of the first message service.

* * * * *

(12) INTER PARTES REEXAMINATION CERTIFICATE (688th)
United States Patent
Laumen et al.

(10) Number: US 7,333,822 C1
(45) Certificate Issued: Sep. 13, 2013

(54) METHOD FOR TRANSMITTING MESSAGES IN A TELECOMMUNICATION NETWORK

(75) Inventors: Josef Laumen, Hildesheim (DE); Joerg Reinecke, Sickte (DE); Frank Schange, Hildesheim (DE); Gunnar Schmidt, Wolfenbuettel (DE)

(73) Assignee: IPCOM GmbH & Co. KG, Pullach (DE)

Reexamination Request:
No. 95/001,211, Aug. 12, 2009

Reexamination Certificate for:
Patent No.: 7,333,822
Issued: Feb. 19, 2008
Appl. No.: 10/182,687
Filed: Oct. 29, 2002

(21) Appl. No.: 95/001,211

(22) PCT Filed: Jan. 25, 2001

(86) PCT No.: PCT/DE01/00285
§ 371 (c)(1),
(2), (4) Date: Oct. 29, 2002

(87) PCT Pub. No.: WO01/58183
PCT Pub. Date: Aug. 9, 2001

(30) Foreign Application Priority Data

Feb. 2, 2000 (DE) .................................. 100 04 260

(51) Int. Cl.
*H04W 4/12* (2009.01)
*H04M 11/00* (2006.01)

(52) U.S. Cl.
USPC ........ 455/466; 370/352; 370/469; 455/412.1; 455/415; 455/426.1; 455/552.1; 710/117

(58) Field of Classification Search
None
See application file for complete search history.

(56) References Cited

To view the complete listing of prior art documents cited during the proceeding for Reexamination Control Number 95/001,211, please refer to the USPTO's public Patent Application Information Retrieval (PAIR) system under the Display References tab.

*Primary Examiner* — Roland Foster

(57) ABSTRACT

A method is provided for transmitting messages, for example, in a telecommunications network, in which a first message service and a second message service are available. Dedicated messages of the first message service are sent using messages of the second message service. An exemplary method may permit an optimized transmission scheme to be maintained for the dedicated messages of the first message service.

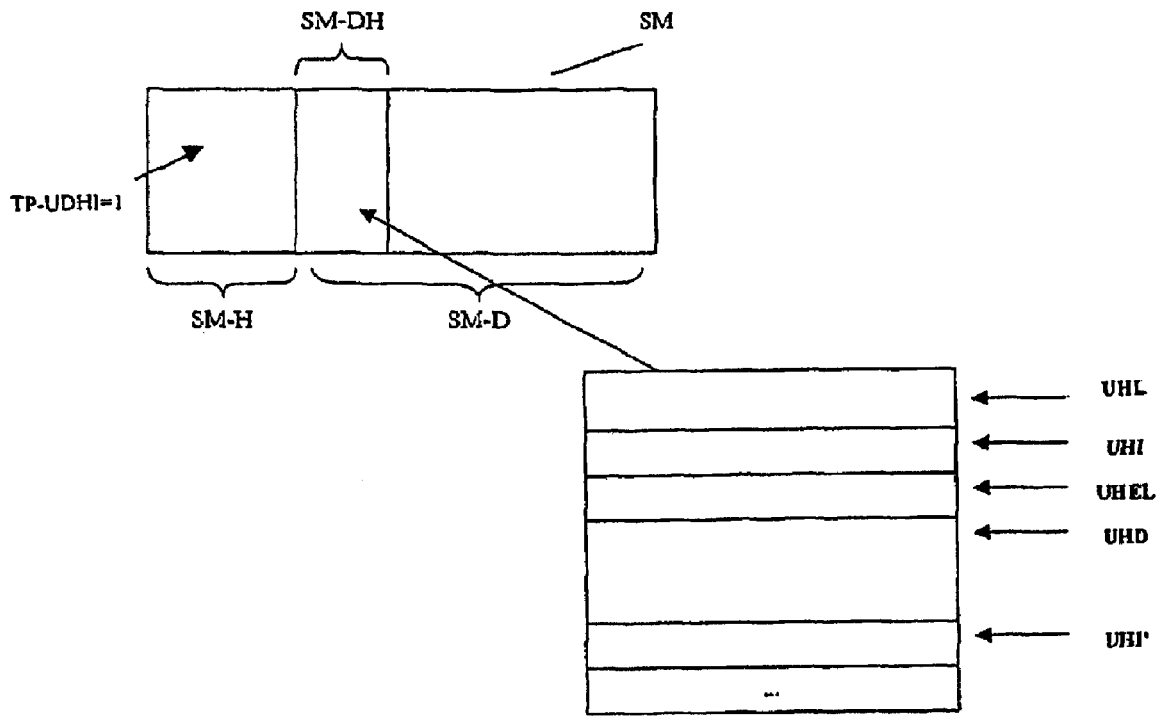

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2-16, 18-21 and 23-26 are cancelled.

Claims 1, 17 and 22 are determined to be patentable as amended.

New claims 27-48 are added and determined to be patentable.

1. A method for transmitting messages in a telecommunications network including a first message service and a second message service, *the first message service having a dedicated, first group of messages*, the method comprising:
sending a *message of the* dedicated, first group of messages of the first message service using [messages] *a short message* of the second message service, the second message service being a short message service, [a] *the* short message being provided with *a header portion and* a [first] data portion, *the data portion* including an identification of a type of *the* message of the first message service;
wherein the short message includes an identifier in the [first] data portion [of the short message] for indicating a presence of [a] *the* message of the first message service *in the data portion*, and wherein the identifier is distinct from the message of the first message service;
wherein the first message service includes an MMS message service and the second message service includes an SMS message service[.] ; and
*wherein* the dedicated, first group of messages of the first message service includes at least one of the following messages: dedicated MMS user messages, notification of the presence of a *second* message *of the first message service* on the MMS server, [logging on to] an MMS session *establishment message, an MMS session establishment* receipt [for the logging on], explicit request for a notification from [the] *an* MMS relay, confirmation of reception of sent [MMs] *MMS messages* in the *MMS* relay, confirmation of success in sending [MMs] *MMS messages* to other users, acknowledgment of success/failure in delivering [an MM] *MMS messages*, and *a message* triggering automatic [MM-download] *MMS message-download*.

17. A method for transmitting messages in a telecommunications network including a first message service and a second message service, *the first message service having a dedicated, first group of messages*, the method comprising:
sending a *message of the* dedicated, first group of messages of the first message service by [messages] *a short message* of the second message service, *the short message comprising a header portion and a data portion*;
wherein the first message service includes an MMS message service according to the 3GPP system, and the dedicated, first group of messages of the first message service includes at least one of the following messages: dedicated MMS user messages, confirmation of reception of sent [MMs] *MMS messages* in [the] *an MMS* relay, confirmation of success in sending [MMs] *MMS messages* to other users, and acknowledgment of success/failure in delivering [an MM] *MMS messages*;
wherein the [messages] *short message* of the second message service [are] *is* sent between a transmitter and a receiver without line-oriented transmission; and
*wherein the message of the first message service and elements for defining the message of the first message service are included in the data portion of the short message; and*
wherein [one of the following is satisfied: (i) the first message service includes a multimedia message service; (ii) the short message includes a second data portion, the second data portion including at least one of the following elements for defining the message of the first message service: identification of the type of message of the first message service, and a content of the message of the first message service; (iii) a user data header of the short message includes at least a portion of the elements for defining the message of the first message service; and (iv) a] *the* header *portion* of the short message includes an identifier for indicating a presence of the message of the first message service *within the data portion of the short message*.

22. A method for transmitting messages in a telecommunications network including a first message service and a second message service, *the first message service having a dedicated, first group of messages and a second group of messages*, the method comprising:
sending a *message of the* dedicated, first group of messages of the first message service by messages of the second message service, *each message of the second message service being a short message that includes a header portion and a data portion*;
wherein the first message service includes an MMS message service according to the 3GPP system, and the dedicated, first group of messages of the first message service includes at least one of the following messages: dedicated MMS user messages, confirmation of reception of sent [MMs] *MMS messages* in [the] *an MMS* relay, confirmation of success in sending [MMs] *MMS messages* to other users, and acknowledgment of success/failure in delivering [an MM] *MMS messages*;
wherein [a] *the* dedicated second group of messages of the first message service is sent between a transmitter and a receiver using line-oriented transmission; and
wherein [one of the following is satisfied: (i) the first message service includes a multimedia message service; (ii) the short message includes a second data portion, the second data portion including at least one of the following elements for defining the message of the first message service: identification of the type of message of the first message service, and a content of the message of the first message service; (iii)] a user data header *within the data portion* of the short message includes [at least a portion of the] elements for defining the message of the first message service[; and (iv) a header of the short message includes an identifier for indicating a presence of the message of the first message service] *and the data portion further includes the message of the first message service*.

27. *The method of claim 1, wherein the identification of the type of the message of the first message service and the iden-* tifier for indicating the presence of the message of the first message service are included in a user data header of the data portion of the short message.

28. The method of claim 27, wherein the user data header is constructed in WCMP format.

29. The method of claim 1, wherein the data portion of the short message further includes an indication of a length of the message of the first message service.

30. The method of claim 29, wherein the identification of the type of the message of the first message service, the identifier for indicating the presence of the message of the first message service and the indication of the length of the message of the first message service are included in a user data header of the data portion of the short message.

31. The method of claim 30, wherein the user data header is constructed in WCMP format.

32. The method of claim 1, wherein the short message of the second message service is sent between a transmitter and a receiver.

33. The method of claim 32, wherein the transmitter is a MMS relay and the receiver is a subscriber.

34. The method of claim 1, wherein the short message of the second message service is sent between a transmitter and a receiver without line-oriented transmission.

35. The method of claim 1, wherein the first message service further comprises a dedicated second group of messages and wherein the dedicated second group of messaged of the first message service is sent between a transmitter and a receiver using line-oriented transmission.

36. The method of claim 17, wherein the identification of the type of the message of the first message service is included in a user data header of the data portion of the short message.

37. The method of claim 17, wherein the user data header is constructed in WCMP format.

38. The method of claim 17, wherein the data portion of the short message further includes an indication of a length of the message of the first message service.

39. The method of claim 38, wherein the identification of the type of the message of the first message service and the indication of the length of the message of the first message service are included in a user data header of the data portion of the short message.

40. The method of claim 17, wherein the first message service further comprises a dedicated second group of messages and wherein the dedicated second group of messaged of the first message service is sent between the transmitter and the receiver using line-oriented transmission.

41. The method of claim 17, wherein the transmitter is an MMS relay and the receiver is a subscriber.

42. The method of claim 22, wherein the elements for defining the message of the first message service comprise an identification of the type of the message of the first message service and an indication of a length of the message of the first message service.

43. The method of claim 42, wherein the elements for defining the message of the first message service further comprise an identifier for indicating the presence of the message of the first message service within the data portion of the short message.

44. The method of claim 42, wherein the header portion of the short message includes an identifier for indicating the presence of the message of the first message service within the data portion of the short message.

45. The method of claim 22, wherein the header portion of the short message includes an identifier for indicating the presence of the message of the first message service within the data portion of the short message.

46. The method of claim 22, wherein the user data header is constructed in WCMP format.

47. The method of claim 22, wherein the messages of the second message service are sent between the transmitter and the receiver without line-oriented transmission.

48. The method of claim 22, wherein the transmitter is a MMS relay and the receiver is a subscriber.

* * * * *